US007746335B2

(12) United States Patent
Hsu

(10) Patent No.: US 7,746,335 B2
(45) Date of Patent: Jun. 29, 2010

(54) MULTI-SWITCH HALF SOURCE DRIVING DISPLAY DEVICE AND METHOD FOR LIQUID CRYSTAL DISPLAY PANEL USING RGBW COLOR FILTER

(75) Inventor: Wen-Fa Hsu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 778 days.

(21) Appl. No.: 11/559,908

(22) Filed: Nov. 15, 2006

(65) Prior Publication Data

US 2008/0074369 A1 Mar. 27, 2008

(30) Foreign Application Priority Data

Sep. 26, 2006 (TW) .............................. 95135526 A

(51) Int. Cl.
*G06F 3/038* (2006.01)
*G09G 3/36* (2006.01)

(52) U.S. Cl. ............................ 345/209; 345/96; 345/88

(58) Field of Classification Search ........... 345/87–104, 345/209; 349/77–78, 80, 104, 106
See application file for complete search history.

(56) References Cited

U.S. PATENT DOCUMENTS 5,448,258 A * 9/1995 Edwards ...................... 345/90
6,075,505 A * 6/2000 Shiba et al. .................... 345/87
6,833,888 B2 * 12/2004 Song et al. .................. 349/106
6,859,195 B2 * 2/2005 Kodate ......................... 345/92
6,954,191 B1 10/2005 Hirano et al.
7,286,107 B2 * 10/2007 Lee et al. ....................... 345/92
2001/0015715 A1 * 8/2001 Hebiguchi et al. ............ 345/92
2005/0231455 A1 * 10/2005 Moon .......................... 345/89
2006/0202927 A1 * 9/2006 Lee ............................. 345/88

FOREIGN PATENT DOCUMENTS

WO 2006070559 7/2006

* cited by examiner

*Primary Examiner*—Bipin Shalwala
*Assistant Examiner*—Keith Crawley
(74) *Attorney, Agent, or Firm*—Jianq Chyun IP Office

(57) ABSTRACT

A display device for a liquid crystal display (LCD) panel using a RGBW color filter and a display method thereof are provided. The display device includes a source driver and a MSHD(Multi-Switch Half source Driving) display panel. The display method includes arranging the RGB color filter onto the MSHD display panel; using the source driver to drive a plurality of pixels of the MSHD display panel in a polarity-dot-inversion form; and displaying a frame formed of the plurality of pixels of the MSHD display panel which are in polarity-dot-inversion form via the light passing through the RGBW color filter.

12 Claims, 12 Drawing Sheets

| | S1 | S2 | S3 | S4 | S5 | S6 |
|---|---|---|---|---|---|---|
| | R | G | B | R | G | B |
| G0 | (1,1) | (1,2) | (1,3) | (1,4) | (1,5) | (1,6) |
| G1 | (2,1) | (2,2) | (2,3) | (2,4) | (2,5) | (2,6) |
| G2 | (3,1) | (3,2) | (3,3) | (3,4) | (3,5) | (3,6) |
| G3 | (4,1) | (4,2) | (4,3) | (4,4) | (4,5) | (4,6) |

FIG. 3

| | | |
|---|---|---|
| R | G | B |
| R | G | B |
| R | G | B |
| R | G | B |
| R | G | B |

FIG. 4A

| | | | |
|---|---|---|---|
| R | G | R | G |
| W | B | W | B |
| R | G | R | G |
| W | B | W | B |
| R | G | R | G |
| W | B | W | B |

FIG. 4B

S1 S2 S3 S4 S5 S6

| | R | G | B | R | G | B |
|---|---|---|---|---|---|---|
| G0 | + | + | + | + | + | + |
| G1 | + | + | + | + | + | + |
| G2 | + | + | + | + | + | + |
| G3 | + | + | + | + | + | + |

FIG. 5A

S1 S2 S3 S4 S5 S6

| | R | G | B | R | G | B |
|---|---|---|---|---|---|---|
| G0 | + | − | + | − | + | − |
| G1 | + | − | + | − | + | − |
| G2 | + | − | + | − | + | − |
| G3 | + | − | + | − | + | − |

FIG. 5B

S1 S2 S3 S4 S5 S6

| | R | G | B | R | G | B |
|---|---|---|---|---|---|---|
| G0 | + | + | + | + | + | + |
| G1 | − | − | − | − | − | − |
| G2 | + | + | + | + | + | + |
| G3 | − | − | − | − | − | − |

FIG. 5C

S1 S2 S3 S4 S5 S6

| | R | G | B | R | G | B |
|---|---|---|---|---|---|---|
| G0 | + | − | + | − | + | − |
| G1 | − | + | − | + | − | + |
| G2 | + | − | + | − | + | − |
| G3 | − | + | − | + | − | + |

FIG. 5D

S1 S2 S3 S4 S5 S6

| | R | G | B | R | G | B |
|---|---|---|---|---|---|---|
| G0 | + | − | + | − | + | − |
| G1 | + | − | + | − | + | − |
| G2 | − | + | − | + | − | + |
| G3 | − | + | − | + | − | + |

FIG. 5E

MULTI-SWITCH HALF SOURCE DRIVING DISPLAY DEVICE AND METHOD FOR LIQUID CRYSTAL DISPLAY PANEL USING RGBW COLOR FILTER

CROSS-REFERENCE TO RELATED APPLICATION

This application claims the priority benefit of Taiwan application serial no. 95135526, filed Sep. 26, 2006. All disclosure of the Taiwan application is incorporated herein by reference.

BACKGROUND OF THE INVENTION

1. Field of the Invention

The present invention relates to a display device for enhancing the image quality of a display panel and a display method thereof, and more particularly, to a display device for enhancing the image quality of a display panel using a RGBW (red, green, blue, and white) color filter, and a display method thereof.

2. Description of Related Art

FIG. 1 is a circuit block diagram of a conventional liquid crystal display (LCD). The gate drive integrated circuits (GD1-GDn) of a gate driver 101 are used to turn on and turn off the thin film transistor of an LCD panel 103, and the source drive integrated circuits (SD1-SDm) of a source driver 102 are used to output data to a liquid crystal capacitor to make the voltage thereof reach a desired level at the time that the thin film transistor is turned on. In other words, only one pixel datum is written by each source line during each horizontal period. FIG. 2 is a circuit diagram of the conventional LCD panel 103. For example, as for one pixel in FIG. 2, when the transistor T1 is turned on by the gate line G0, the data is input to the liquid crystal capacitor C1 by the source line $S_n$.

FIG. 3 is a positional distribution diagram of some pixels of the conventional LCD panel 103. For illustration purpose, R, G, and B represent red, green, and blue, respectively. For example, (1,1), (2,1), (3,1), (4,1), (1,4), (2,4), (3,4), and (4,4) represent red pixels. These pixels are written in according to the following sequence. First, the gate line G0 is turned on and then data is written into (1,1)-(1,6) . Then, the gate line G1 is turned on and then data is written into (2,1)-(2,6). The gate lines G2 and G3 have the same functions as the gate lines G1 and G2 and will not be described hereinafter.

FIG. 4A is a color distribution diagram of the RGB color filter in FIG. 3, where the colors R, G, and B are distributed in a strip shape. FIG. 4B is a color distribution diagram of the RGBW color filter. In the mosaic distribution diagram of the RGBW color filter in FIG. 4B, W represents white. Because the blocks W are newly added to this arrangement, the overall luminance of the panel is increased. According to the current driving techniques, in order to prevent the polarization of liquid crystals, the driving polarity of the LCD can be a frame inversion polarity, a column inversion polarity, a row inversion polarity, or a dot inversion polarity and FIGS. 5A, 5B, 5C, and 5D are their polarity distribution diagrams, respectively. In addition, in order to solve the frame flickering problem when the operating system, e.g. MICROSOFT WINDOWS, is shut down, a distribution diagram of the driving polarities of two-dot inversion is shown in FIG. 5E. In FIGS. 5A-5E, the sign "+" denotes that the voltage of data written into a liquid crystal is greater than a common voltage Vcom and the voltage of the data is positive with respect to the common voltage Vcom, and a sign "−" denotes that the voltage of data written into a liquid crystal is smaller than the common voltage Vcom and the voltage of the data is negative with respect to the common voltage Vcom. The polarity distribution in FIG. 5D is suitable for the RGB color filter in FIG. 4A to achieve the effect of dot inversion, but such polarity distribution causes a negative effect on the RGBW color filter in FIG. 4B.

When the above-mentioned RGBW color filter has the conventional driving polarities of a current LCD, as shown in FIG. 5A through 5D, the panel displays a monochrome in the frame inversion, thereby causing the flicker of frames and as shown in FIG. 5E, the row inversion occurs to cause horizontal crosstalk. Accordingly, both the frame inversion and the row inversion have negative effects on the image quality. FIG. 6A is a polarity distribution diagram when the dot inversion driving is adopted by the RGBW color filter. However, when a monochrome is displayed, the pixels of the whole frame have the same polarity. FIG. 6B is a polarity distribution diagram when the two-dot inversion driving is adopted by the RGBW color filter. However, when a monochrome is displayed, the row inversion occurs, thereby causing horizontal crosstalk. Therefore, a conventional pixel level simplex LCD panel using a RGBW color filter causes many disadvantages.

U.S. Pat. No. 6,833,888 discloses an LCD device having RGBW color filters. However, the RGBW color filters are arranged in a horizontal strip shape, which incurs poor space utilization. U.S. Pat. No. 6,954,191 discloses a RGBW-typed LCD device. However, a complicated drive circuit should be redesigned for the LCD.

SUMMARY OF THE INVENTION

Accordingly, the present invention is directed to a display method for enhancing the image quality of a display panel using a RGBW color filter, so as to resolve the problems of the prior art described above.

The present invention is also directed to provide a display device for enhancing the image quality of a display panel using a RGBW color filter, so as to avoid the flicker of frames and horizontal crosstalk when a monochrome is displayed.

The method for enhancing the image quality of a display panel using a RGBW color filter provided by the present invention comprises arranging the RGBW color filter onto a MSHD(Multi-Switch Half source Driving) display panel; using a source driver to drive a plurality of pixels of the MSHD display panel in a polarity-dot-inversion form; and the plurality of pixels of the MSHD display panel display display a frame in polarity-dot-inversion form.

According to a preferred embodiment of the present invention, the aforementioned RGBW color filter comprises a plurality of regions, each of which comprises a red block, a green block, a blue block, and a white block, each of the regions is a square region, and the red block, the green block, the blue block, and the white block are formed at four corners of the square region, respectively.

According to a preferred embodiment of the present invention, the aforementioned MSHD display panel comprises a plurality of gate lines and a plurality of source lines, wherein the plurality of gate lines are coupled to a gate driver, and the plurality of source lines are coupled to the source driver and each of the plurality of source lines and the corresponding gate lines drive two pixels.

A display device for improving the image quality of a display panel using a RGBW color filter provided by the present invention comprises a source driver and a MSHD display panel, wherein the MSHD display panel comprises a RGBW color filter. The source driver is used to drive a plurality of pixels of the MSHD display panel in a polarity-dot inversion-form, and the plurality of pixels of the MSHD display panel display a frame in polarity-dot-inversion form.

According to a preferred embodiment of the present invention, the aforementioned display device for improving the image quality of a MSHD display panel comprises a plurality of gate lines and a plurality of source lines, wherein the $X_{th}$ gate line is coupled to the gate electrode of a first transistor, the $(X+1)_{th}$ gate line is coupled to the gate electrode of a second transistor, a $Y_{th}$ source line is coupled to the source electrode of the second transistor, the source electrode of the first transistor is coupled to the drain electrode of the second transistor, the drain electrode of the first transistor is coupled to a first pixel capacitor, and the drain electrode of the second transistor is coupled to a second pixel capacitor.

According to a preferred embodiment of the present invention, the method of displaying a frame of a plurality of pixels of the MSHD display panel in polarity-dot-inversion form comprises sequentially driving the pixels in a $L_{th}$ row and pixels in a $(L+1)_{th}$ row, wherein L is a natural number, wherein the step of sequentially driving the pixels in the $L_{th}$ row and the pixels in the $(L+1)_{th}$ row comprises: first, driving a first pixel in the $L_{th}$ row; second, driving a second pixel in the $(L+1)_{th}$ row; and Third, driving a third pixel in the $L_{th}$ row.

In the present invention, since the source driver is used to drive a plurality of pixels of the MSHD display panel with the RGBW color filter in a polarity-dot-inversion form, the flicker of frames is avoided and the horizontal crosstalk is reduced, thereby enhancing the image quality.

In order to make the aforementioned and other objects, features and advantages of the present invention comprehensible, preferred embodiments accompanied with figures are described in detail below.

BRIEF DESCRIPTION OF THE DRAWINGS

FIG. 3 is a positional distribution diagram of some pixels of the conventional LCD panel 103.

FIG. 4A is a color distribution diagram of the RGB color filter in FIG. 3.

FIG. 4B is a color distribution diagram of a RGBW color filter.

FIG. 5A is a polarity distribution diagram of the frame inversion.

FIG. 5B is a polarity distribution diagram of the column inversion.

FIG. 5C is a polarity distribution diagram of the row inversion.

FIG. 5D is a polarity distribution diagram of the dot inversion.

FIG. 5E is a distribution diagram of the driving polarity of the two-dot inversion.

DESCRIPTION OF EMBODIMENTS

Figure 7:
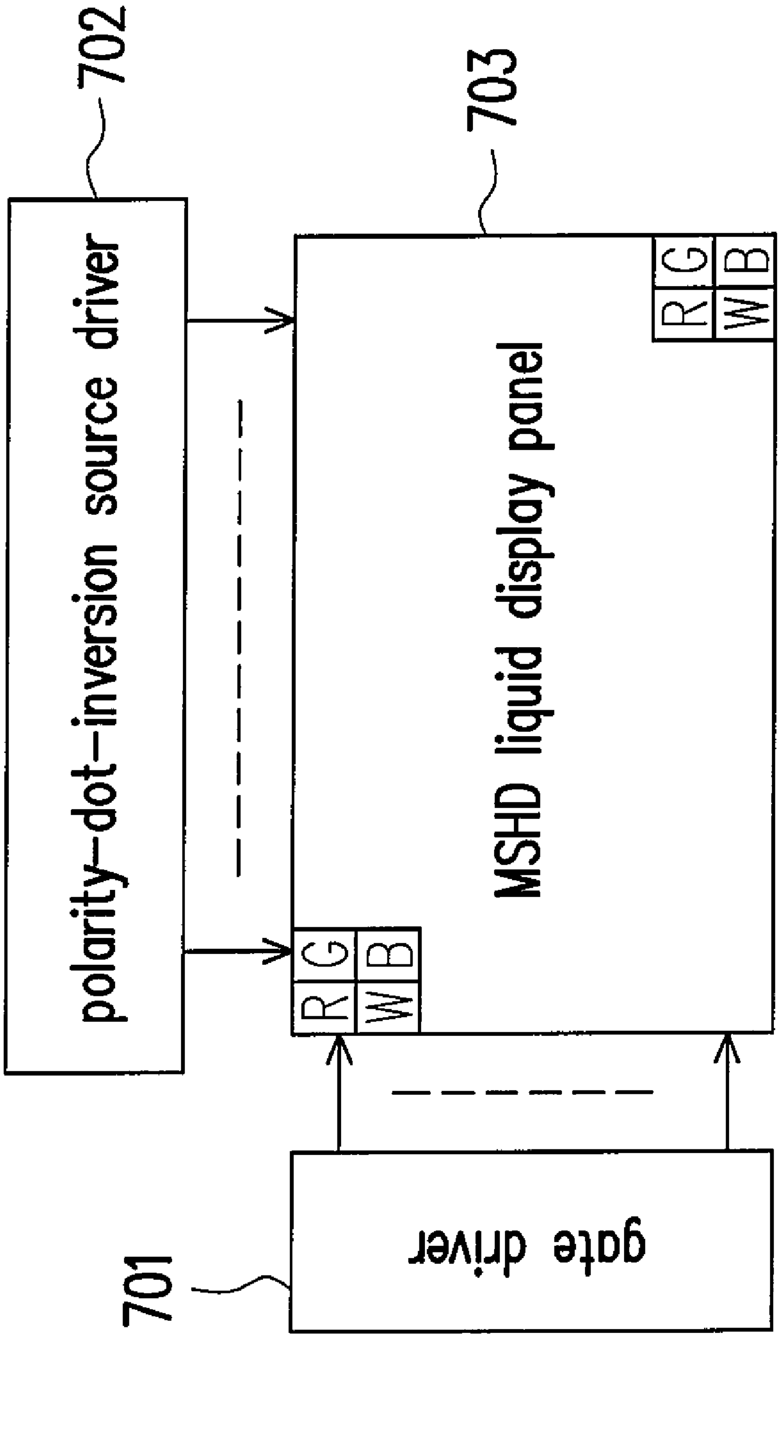
FIG. 7 shows a driving device for enhancing the image quality using the RGBW color filter according to an embodiment of the present invention.

FIG. 7 shows a driving device for enhancing the image quality of a display panel using a RGBW color filter according to an embodiment of the present invention. The display panel comprises a gate driver 701, a polarity-dot-inversion source driver 702, and a MSHD display panel 703, wherein the MSHD display panel 703 comprises a RGBW color filter. The RGBW color filter comprises a plurality of regions, each of which comprises a red (R) block, a green (G) block, a blue (B) block, and a white (W) block, wherein the red block, the green block, the blue block, and the white block are formed in the four corners of the square region, respectively. The source driver 702 drives a plurality of pixels of the MSHD display panel 703 in a polarity-dot-inversion form, and the plurality of pixels of the MSHD display panel 703 display a frame in polarity-dot-inversion form.

The MSHD display panel 703 comprises a plurality of gate lines and a plurality of source lines, wherein the gate lines are coupled to the gate driver 701, the source lines are coupled to the source driver 702, and each of the source lines and one corresponding gate line together drive two of the pixels.

Figure 8:
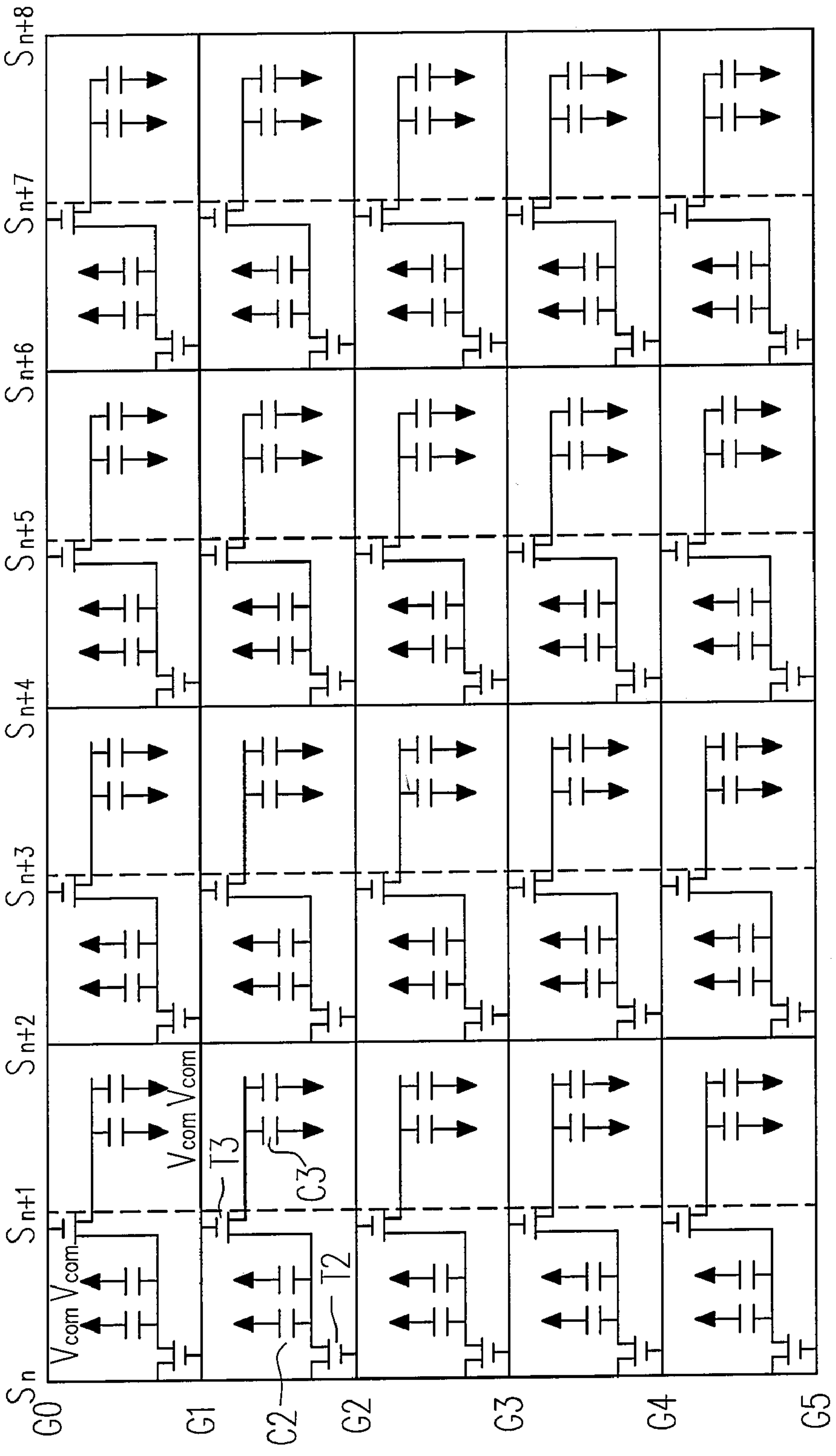
FIG. 8 is a partial circuit diagram of a MSHD LCD panel 703.

FIG. 8 is a partial circuit diagram of the MSHD LCD panel 703. The gate line G2 is coupled to the gate electrode of a thin film transistor T2, the gate line G1 is coupled to the gate electrode of a thin film transistor T3, the source line $S_n$ is coupled to the source electrode of the thin film transistor T2, the source electrode of the thin film transistor T3 is coupled to the drain electrode of the thin film transistor T2, the drain electrode of the thin film transistor T2 is coupled to a pixel capacitor C2, and the drain electrode of the thin film transistor T3 is coupled to a pixel capacitor C3. When only the gate line G2 is conducted, a data voltage is input to the pixel capacitor C2, and when the gate lines G1 and G2 are both conducted, the data voltage is input to the pixel capacitor C3. Accordingly, this driving method may reduce the output of a source integrated circuits by half.

Figure 9A:
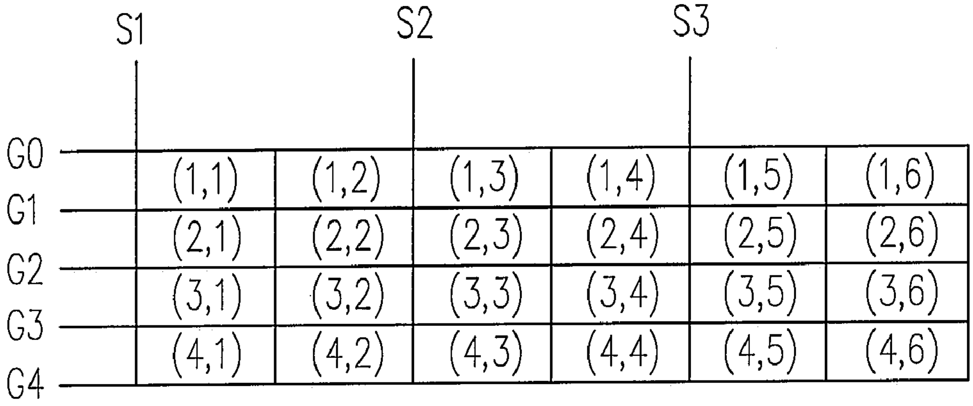
FIG. 9A is a positional distribution diagram of some pixels of the MSHD display panel according to an embodiment of the present invention.
Figure 9B:
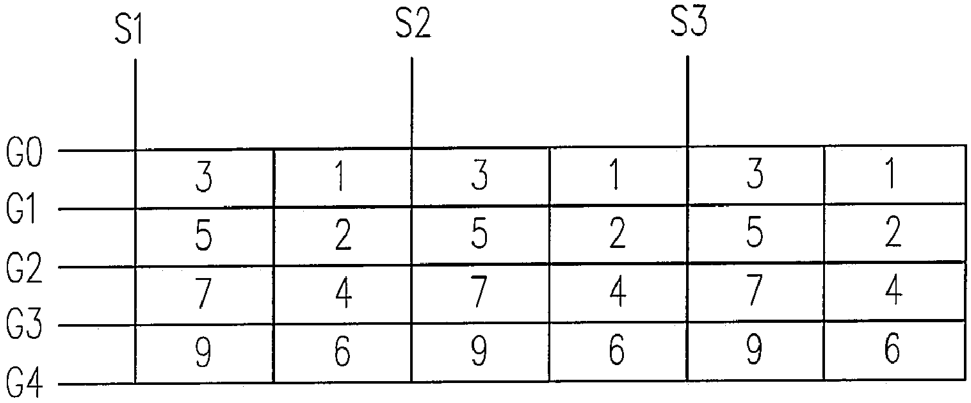
FIG. 9B is a distribution diagram of the write sequence of some pixels of the MSHD display panel in FIG. 8.

FIG. 9A is a positional distribution diagram of some pixels of the MSHD display panel according to an embodiment of the present invention. The data is written according to the sequence as follows. First, the gate lines G0 and G1 are turned on and data is written into (1,2), (1,4), and (1,6). Next, the gate lines G1 and G2 are turned on and data is written into (2,2), (2,4), and (2,6). Next, the gate line G1 is turned on and data is written into (1,1), (1,3), and (1,5). Next, the gate lines G2 and G3 are turned on and data is written into (3,2), (3,4), and (3,6). Next, the gate line G2 is turned on and data is written into (2,1), (2,3), and (2,5). The rest of the details can be derived in a similar way. FIG. 9B is a distribution diagram of the write sequence of some pixels of the MSHD display panel in FIG.

8. Referring to both FIGS. 9A and 9B, the numbers 1-9 in FIG. 9B represent the data write in sequence.

Figure 1:
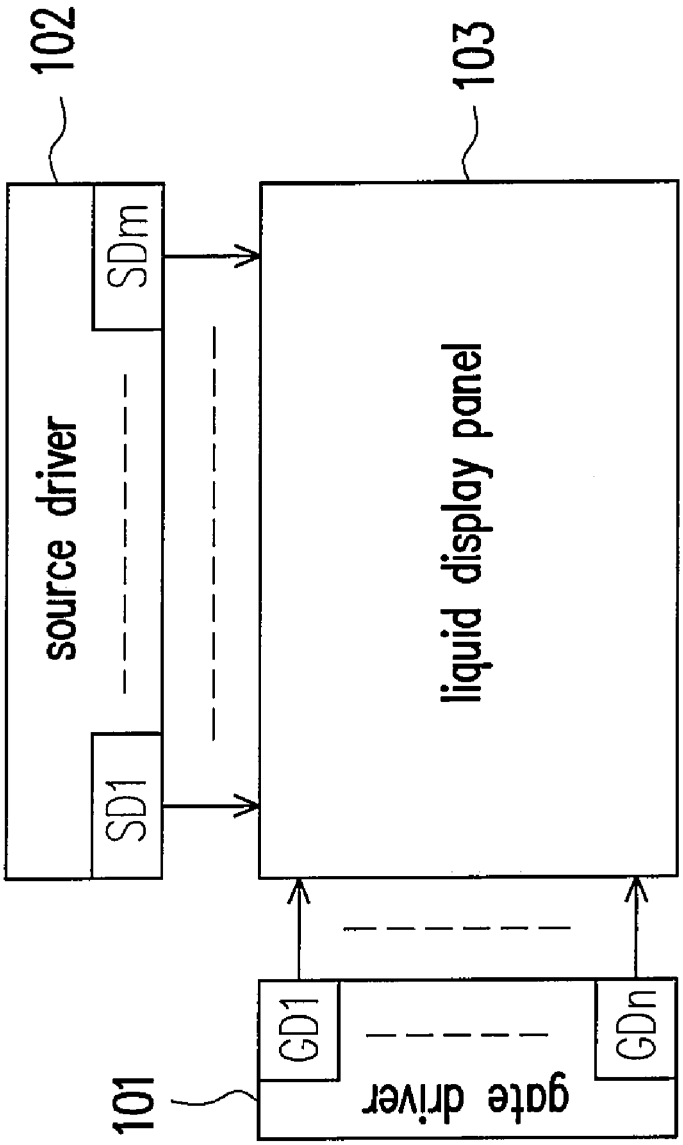
FIG. 1 is a circuit block diagram of a conventional LCD.
Figure 2:
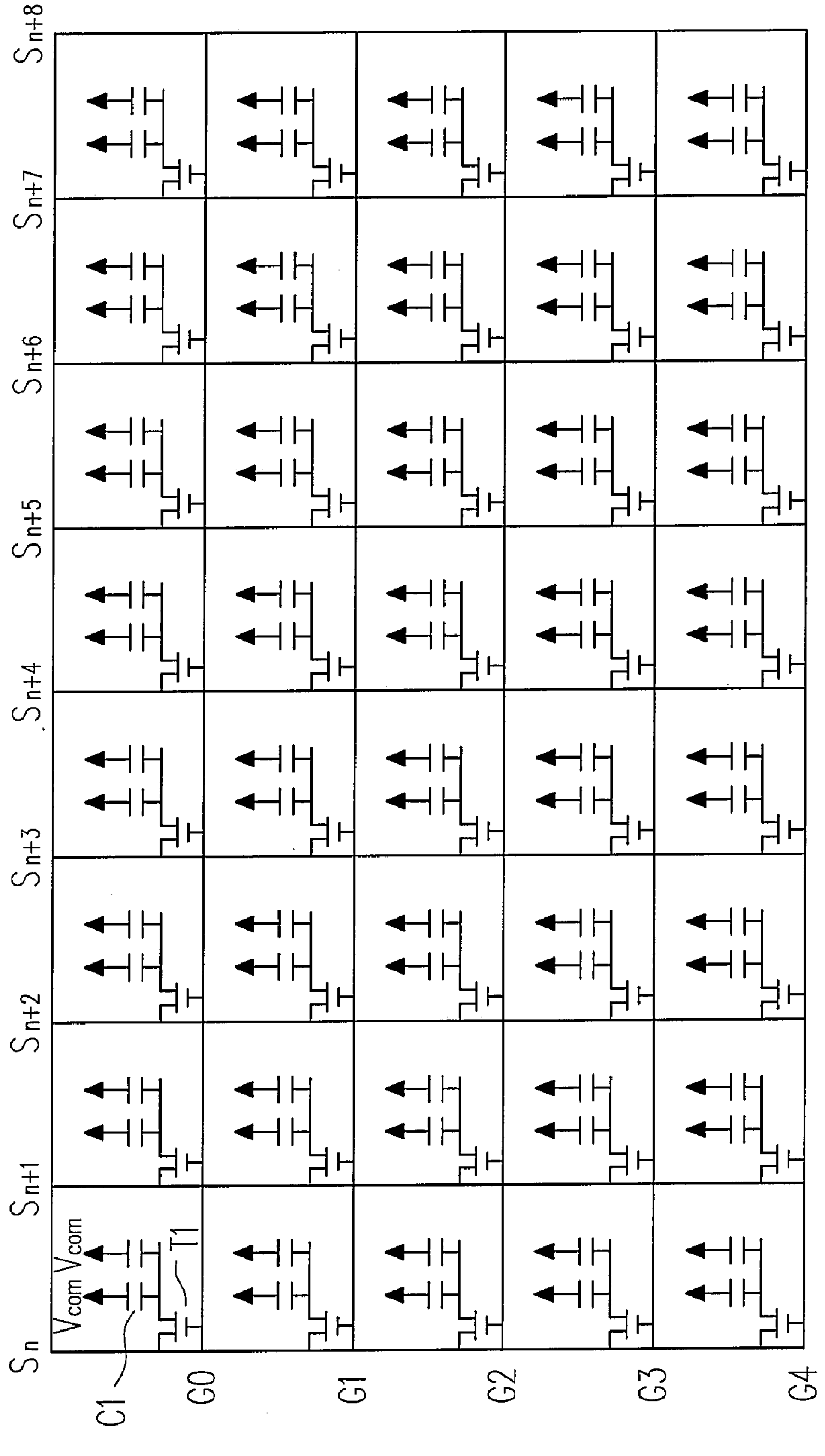
FIG. 2 is a circuit diagram of a conventional LCD panel 103.
Figure 6A:
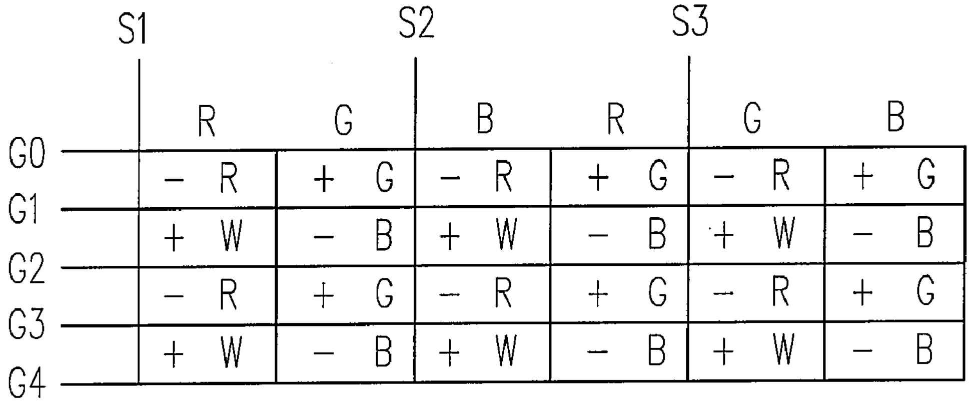
FIG. 6A is a polarity distribution diagram when the dot inversion driving is adopted by the RGBW color filter.
Figure 6B:
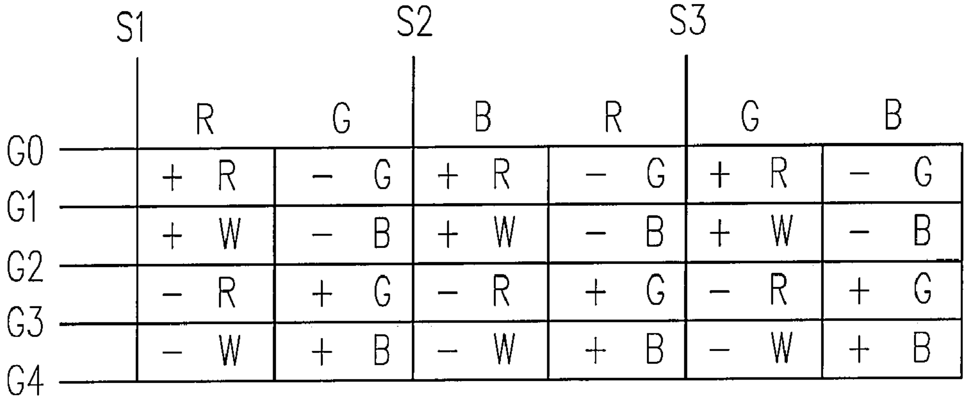
FIG. 6B is a polarity distribution diagram when the two-dot inversion driving is adopted by the RGBW color filter.
Figure 10:
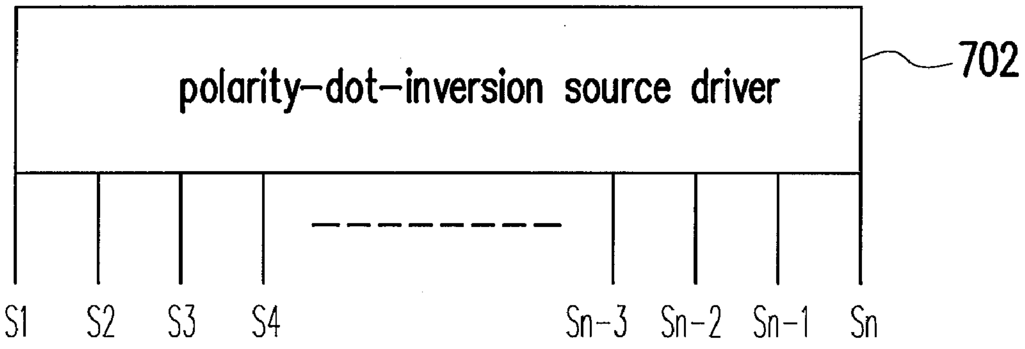
FIG. 10 is a circuit block diagram of a row inversion source driver 702 and the corresponding source lines S1-Sn according to an embodiment of the present invention.
Figure 11:
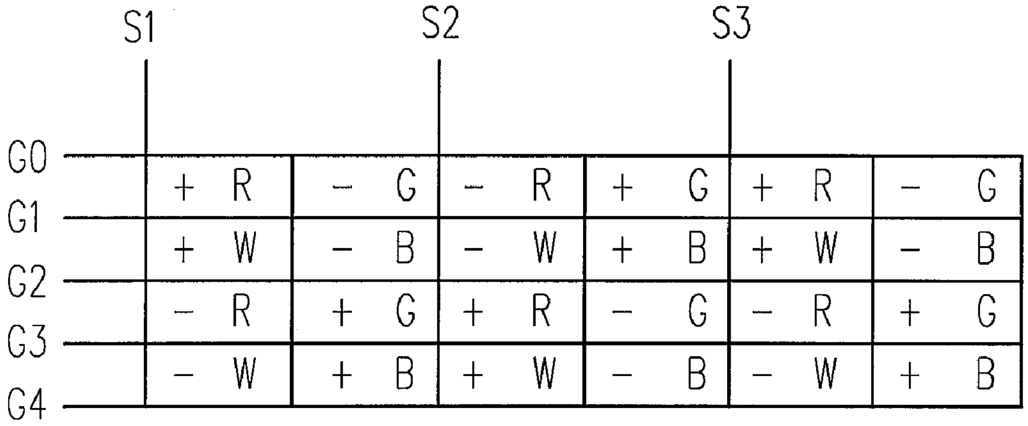
FIG. 11 is a polarity distribution diagram of some pixels of the MSHD display panel in FIG. 6.
Figure 12A:
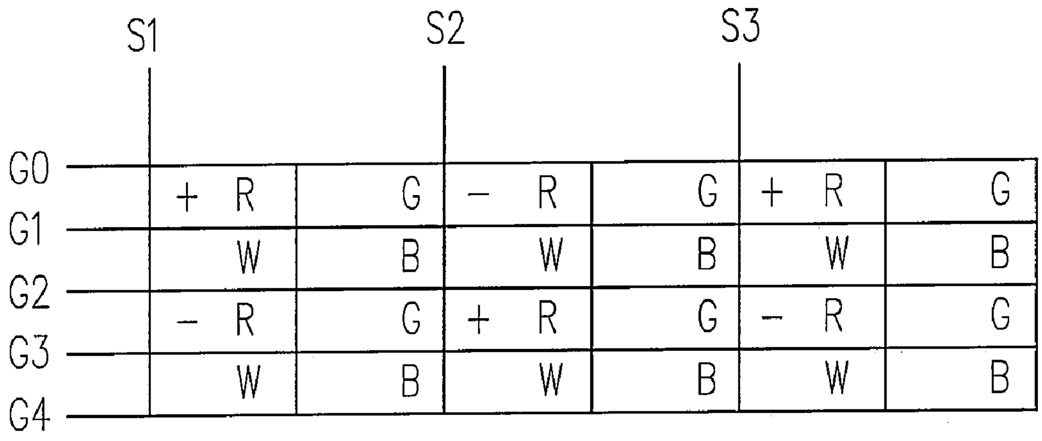
FIG. 12A is a polarity distribution diagram of some red pixels of the MSHD display panel.
Figure 12B:
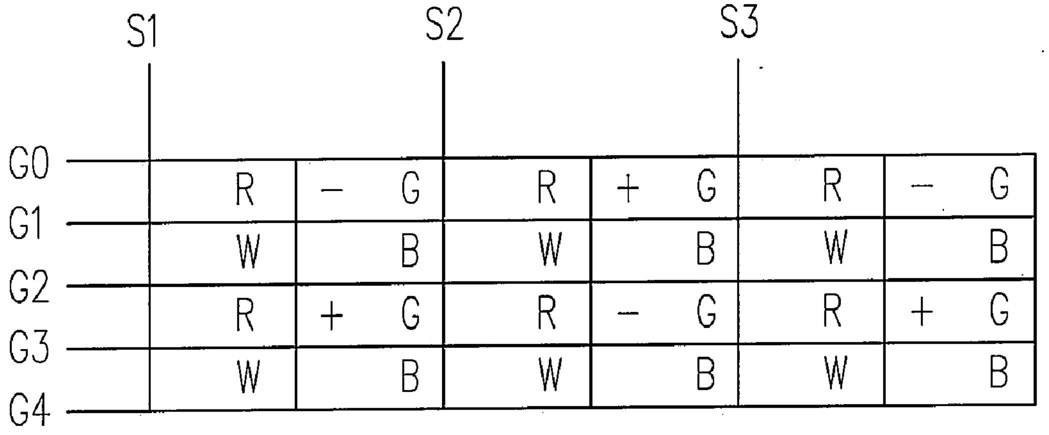
FIG. 12B is a polarity distribution diagram of some green pixels of the MSHD display panel.
Figure 12C:
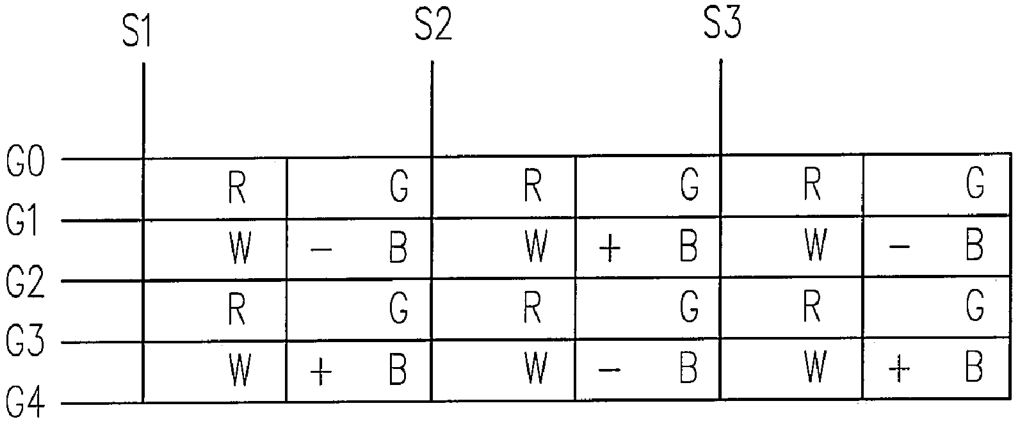
FIG. 12C is a polarity distribution diagram of some blue pixels of the MSHD display panel.
Figure 12D:
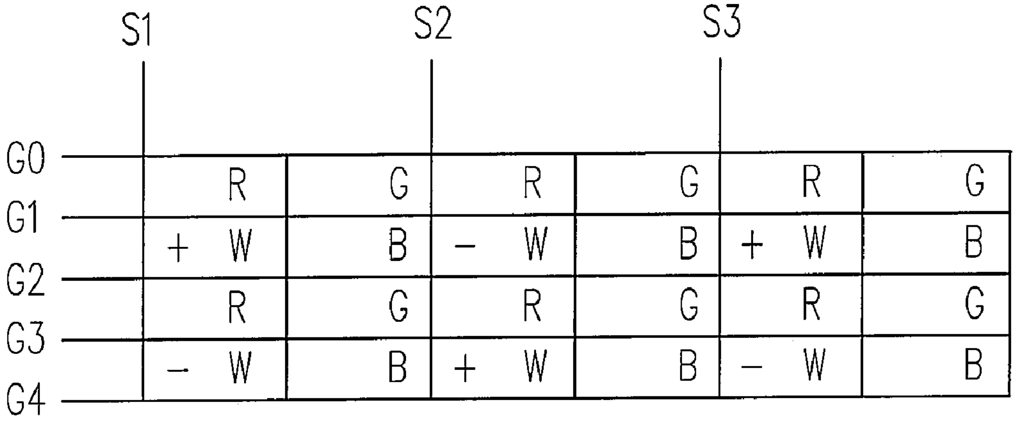
FIG. 12D is a polarity distribution diagram of some white pixels of the MSHD display panel.

FIG. 10 is a circuit block diagram of the polarity-dot-inversion source driver 702 and the corresponding source lines S1-Sn according to an embodiment of the present invention. The polarities of the both neighboring output of the polarity-dot-inversion source driver are different at a same time. For example, at a particular timing, the polarities of the outputs of the source lines S1, S3, Sn-3, and Sn-1 are positive, and the polarities of the outputs of the source lines S2, S4, Sn-2 and Sn are negative. At a subsequent timing, the polarities of the outputs of the source lines S1, S3, Sn-3, and Sn-1 are negative, and the polarities of the outputs of the source lines S2, S4, Sn-2, and Sn are positive. FIG. 11 is a polarity distribution diagram of some pixels of the MSHD display panel in FIG. 6. The polarity distribution diagram in FIG. 11 represents two horizontal lines which are in the 1+2 dot inversion. FIGS. 12A-12D are polarity distribution diagrams of some monochromatic pixels of the MSHD display panel, from which it can be seen that the red pixel, green pixel, blue pixel, and white pixel are individually displayed in the polarity dot inversion form. Accordingly, it can be concluded that the pixel multidrive method could solve the problem of the non-uniform polarity distribution caused by the pixel single drive.

According to the preferred embodiments of the present invention, any MSHD display panels may be applied to the drive method of the present invention as long as they are driven alternately among each of the lines. Those skilled in the art should know that the method of adopting the polarity-dot-inversion is not limited to the circuit structure of the MSHD display panel described in the aforementioned embodiments.

In view of the above, in the present invention, since the source driver is used to drive a plurality of pixels of the MSHD display panel with the RGBW color filter in a polarity-dot-inversion form, the flicker of frames is avoided and the horizontal crosstalk is reduced, thereby enhancing the image quality.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A display device, comprising:

a source driver; and a MSHD (Multi-Switch Half source Driving) display panel comprising a RGBW (red, green, blue, and white) color filter and a plurality of pixels, so that each of the pixels forms a red pixel, a green pixel, a blue pixel, or white pixel, wherein the source driver drives the pixels of the MSHD display panel in a polarity-two-dot-inversion form, so that the red pixels, the green pixels, the blue pixels, and the white pixels are individually displayed in a polarity-dot-inversion form.

2. The display device as claimed in claim 1, wherein the RGBW color filter comprises a plurality of regions, wherein each of the regions comprises a red block, a green block, a blue block and a white block.

3. The display device as claimed in claim 2, wherein each of the regions is a square region, and the red block, the green block, the blue block, and the white block are formed at four corners of the square region, respectively.

4. The display device as claimed in claim 1, wherein the MSHD display panel comprises a plurality of gate lines and a plurality of source lines, wherein the gate lines are coupled to a gate driver, the source lines are coupled to the source driver, and each of the source lines and two corresponding gate lines drive two of the pixels.

5. The display device as claimed in claim 1, wherein a $X_{th}$ gate line is coupled to the gate of a first transistor, a $(X+1)_{th}$ gate line is coupled to the gate of a second transistor, a $Y_{th}$ source line is coupled to the source of the first transistor, the drain of the first transistor is coupled to a first pixel capacitor and a source of the second transistor, and a drain of the second transistor is coupled to a second pixel capacitor.

6. The display device as claimed in claim 1, wherein the MSHD display panel is a liquid crystal display (LCD) panel.

7. A display method, comprising:

arranging a RGBW color filter on a MSHD display panel having a plurality of pixels, so that each of the pixels forms a red pixel, a green pixel, a blue pixel, or white pixel; and driving the pixels of the MSHD display panel in a polarity-two-dot-inversion form through a source driver, so that the red pixels, the green pixels, the blue pixels, and the white pixels are individually displayed in a polarity-dot-inversion form.

8. The display method as claimed in claim 7, wherein the RGBW color filter comprises a plurality of regions, wherein each of the regions comprises a red block, a green block, a blue block, and a white block.

9. The display method as claimed in claim 8, wherein each of the regions is a square region, and the red block, the green block, the blue block, and the white block are formed at four corners of the square region, respectively.

10. The display method as claimed in claim 7, wherein the MSHD display panel comprises a plurality of gate lines and a plurality of source lines, the gate lines being coupled to a gate driver, the source lines being coupled to the source driver, and each of the source lines and two corresponding gate lines together drive two of the pixels.

11. The display method using a RGBW color filter as claimed in claim 7, wherein the step of displaying a frame of the plurality of pixels of the MSHD display panel in polarity-dot-inversion form comprises sequentially driving the pixels in a $L_{th}$ row and pixels in a $(L+1)_{th}$ row, wherein L is a natural number, wherein the step of sequentially driving the pixels in the $L_{th}$ row and the pixels in the $(L+1)_{th}$ row comprises:

driving a first pixel in the $L_{th}$ row;

driving a second pixel in the $(L+1)_{th}$ row; and driving a third pixel in the $L_{th}$ row.

12. The display method as claimed in claim 7, wherein the MSHD display panel is an LCD panel.

* * * * *